United States Patent [19]
Rando

[11] Patent Number: 5,900,931
[45] Date of Patent: May 4, 1999

[54] SELF-LEVELING SYSTEM FOR OPTICAL DISTANCE MEASURING INSTRUMENTS

[75] Inventor: Joseph F. Rando, Los Altos Hills, Calif.

[73] Assignee: LeveLite Technology, Inc., Mt. View, Calif.

[21] Appl. No.: 09/094,764

[22] Filed: Jun. 15, 1998

[51] Int. Cl.[6] .................................................... G01C 1/10
[52] U.S. Cl. ............................................................ 356/149
[58] Field of Search ........................... 356/138–139, 356/139.05, 139.08, 140, 141.1, 141.2, 141.3, 142–143, 145–147, 149–150, 153, 248, 249, 250, 253, 254; 33/273, 274, 278, 280–286, 290–298

[56] References Cited

U.S. PATENT DOCUMENTS

| | | | |
|---|---|---|---|
| 4,767,208 | 8/1988 | Cain | 356/138 |
| 5,075,977 | 12/1991 | Rando | 33/227 |
| 5,182,863 | 2/1993 | Rando | 33/227 |
| 5,541,727 | 7/1996 | Rando et al. | 356/149 |

*Primary Examiner*—Frank G. Font
*Assistant Examiner*—Michael P. Stafira
*Attorney, Agent, or Firm*—Thomas M. Freiburger

[57] ABSTRACT

A system preferably in the form of an accessory module corrects for tilt angles of a distance measuring laser projecting instrument. The housing of the module includes a compensating mirror mounted on a pendulum which bends with tilt angle by one-half the amount of the housing tilt, so as to reflect the outgoing beam to truly horizontal. In a preferred embodiment a fixed mirror is also included so that the distance measuring instrument can be laid or held approximately horizontally so that its generally horizontal beam is first reflected by the fixed mirror up to the pendulous compensating mirror. The distance measuring instrument preferably has an internal correction to subtract the additional optical path length induced by the use of the accessory module. This may be activated by a switch on the module or automatically when the module is attached to the distance measuring instrument.

20 Claims, 7 Drawing Sheets

SELF-LEVELING SYSTEM FOR OPTICAL DISTANCE MEASURING INSTRUMENTS

BACKGROUND AND SUMMARY OF THE INVENTION

The invention concerns distance measuring instruments. Distance measuring instruments traditionally have used microwaves and infrared radiation to measure distance by way of the velocity of light and time of travel. With the advent of low cost visible laser diodes, instruments which project a visible beam are very popular in this application. In addition to the obvious cost advantage, the operator is able to see the measuring spot because of the visible light beam. Typically, a one milliwatt beam a few millimeters in diameter is used for this purpose in such an instrument. Examples are the model DLE 30 manufactured by Bosch or the DISTO manufactured by Leica of Switzerland. These instruments may be hand held, placed on the floor or used with a tripod. In measuring horizontal distance, the operator adjusts the instrument crudely to be approximately horizontal, which is satisfactory for most cases. The error which results is the cosine of the angle between true horizontal and the actual instrument angle. This error times the distance measured is usually small enough to ignore.

There is, however, a frequent need to use the horizontal beam as a level reference. Normally a separate instrument and setup are used for that purpose. By combining the distance measurement and the projection of a truly horizontal beam, the operator saves time by doing the setup just once. In addition, the measurement is more accurate, which in some cases can be important.

The object of this invention is to provide a truly horizontal measuring beam even though the instrument is not horizontal, such that the instrument can be used to establish level as well as to measure distance.

DESCRIPTION OF PREFERRED EMBODIMENTS

Figure 1:
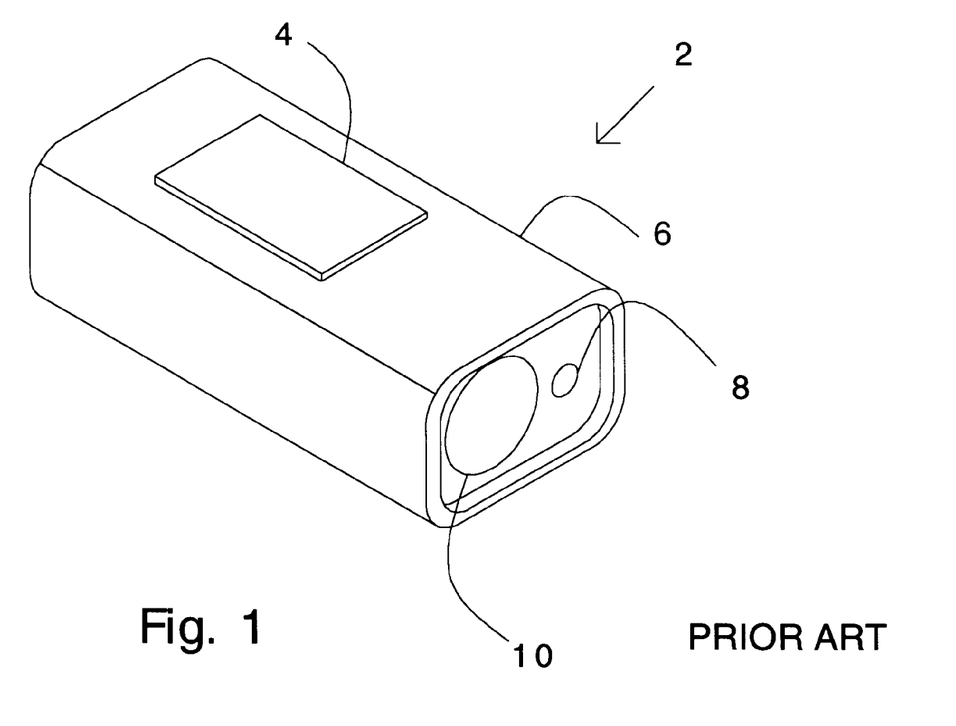
FIG. 1 shows in perspective and schematically a distance measuring laser beam projector in accordance with prior art.

A typical instrument is shown in FIG. 1 and is designated by the number 2. A keypad and display are indicated by 4, on the surface of a housing 6, while an exit aperture for the reading laser beam is shown at 8. An aperture 10 in the housing collects the return light.

Figure 2:
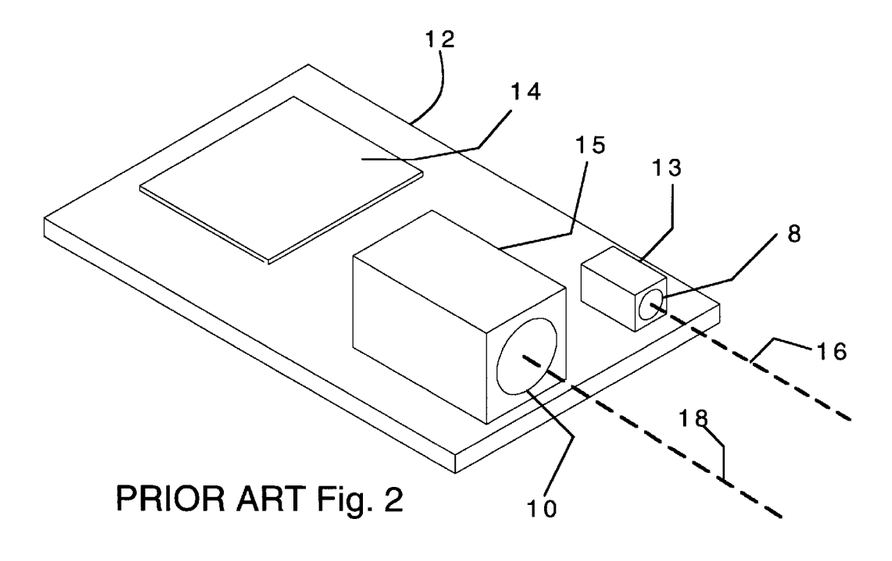
FIG. 2 is a perspective view which schematically shows operation of a distance measuring laser projector as in FIG. 1.

FIG. 2 shows a generic instrument similar to that of FIG. 1, with the outer housing removed. A single electronic PC board 14 is mounted to a lower housing or base 12. The beam generating module 13 and receiving module 15 are also shown. The outgoing beam and return beams are indicated by 16 and 18 respectively. For simplicity connecting cables are not shown.

Figure 3:
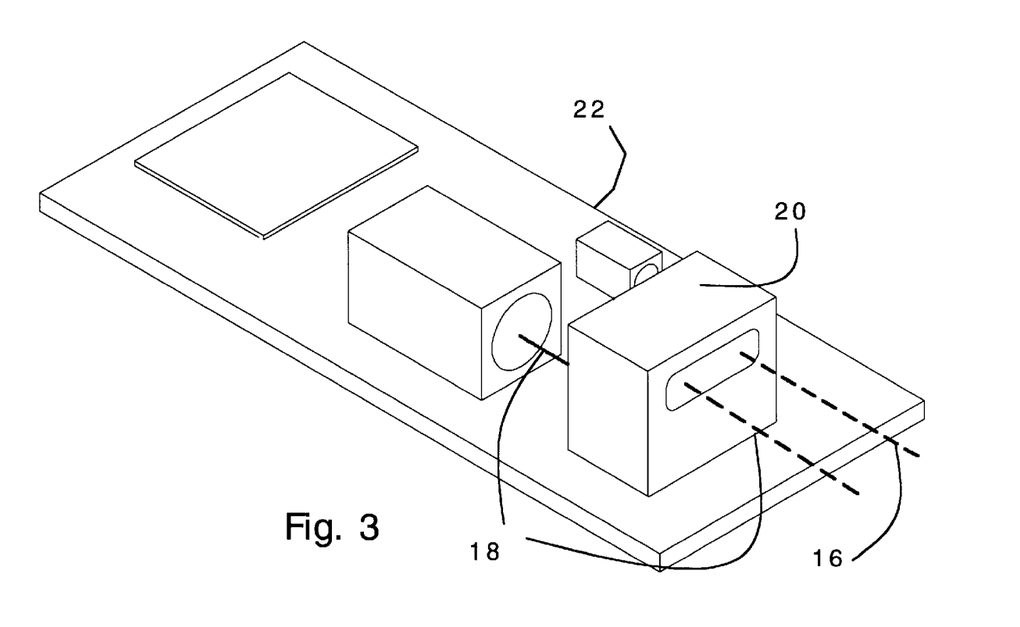
FIG. 3 is a perspective view showing addition of a beam leveling device to the platform of a distance measuring laser instrument, in accordance with the invention.
Figure 4:
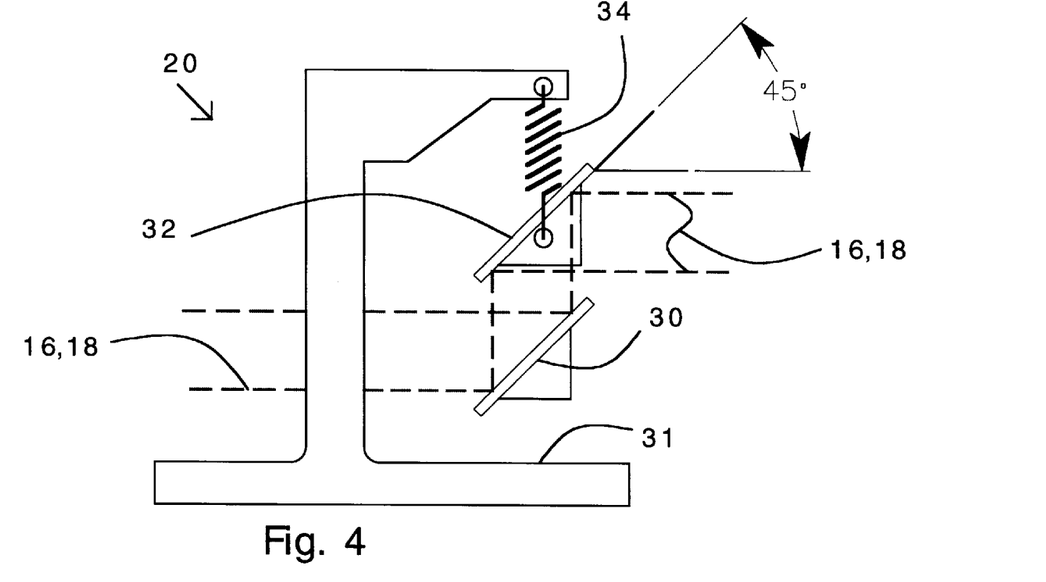
FIGS. 4 and 5 are schematic side elevation views showing principles of the invention whereby a distance measuring beam is automatically leveled regardless of tilt of the instrument's housing.

FIG. 3 shows a self-leveling module 20 according to this invention, mounted to an elongated lower frame or base 22 of a distance measuring instrument, with the same laser beams 16 and 18 indicated. The operation of the module 20 may be learned by studying FIG. 4 which schematically and in principle shows the interior of the module from the side. The outgoing laser beam 16 strikes a fixed mirror 30 which is mounted rigidly to the instrument's lower housing 22, via a rigid frame 31 (the term "frame" as used in the claims is intended to include a frame or a housing as providing mounting for the components). Although the mirror 30 is shown at 45° to the beam, it can be mounted at almost any oblique angle. After reflection the beam strikes a mirror 32 which is suspended by two springs 34, one at each side of the mirror, one spring being visible in FIG. 4. The beam 16 is then reflected out of the instrument. The two mirrors 30 and 32 are approximately at 45 degrees to the longitudinal axis of the instrument (i.e. to the frame 31 and lower housing 22) when the instrument is level.

Figure 5:
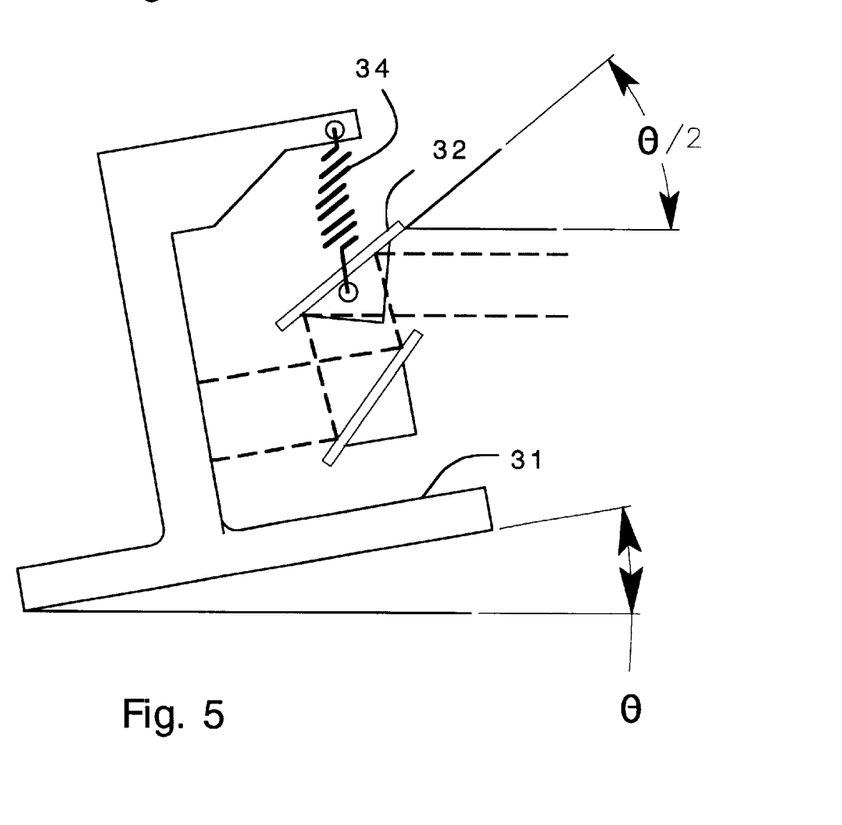

The stiffness of the springs 34 is chosen so that when the housing is tipped an angle θ as shown in FIG. 5, the mirror 32 tilts half that angle. Because of the law of reflection, the beam is reflected at twice that angle and exits the instrument corrected to horizontal. If the spring is too stiff or too weak, errors result. This technique of mounting a reflective surface on a spring-supported pendulum is used in the other self-leveling systems such as those described in U.S. Pat. Nos. 4,767,208 and 5,075,977. In all cases described in those patents, only an outgoing beam is reflected, whereas in the compensating system shown in FIGS. 3–5, a return beam is also reflected. The return beam 18 is reflected back into the instrument and can be considered as lined up with the beam 16 in FIGS. 4 and 5 and not separately illustrated.

In order to make systems of this type practical, the pendulous motion must be damped to allow the beam to quickly assume its correct orientation. In addition, as taught in the above patents, the motion of the pendulum must be limited and shock mounted to avoid damage to the supporting spring member.

Figure 6:
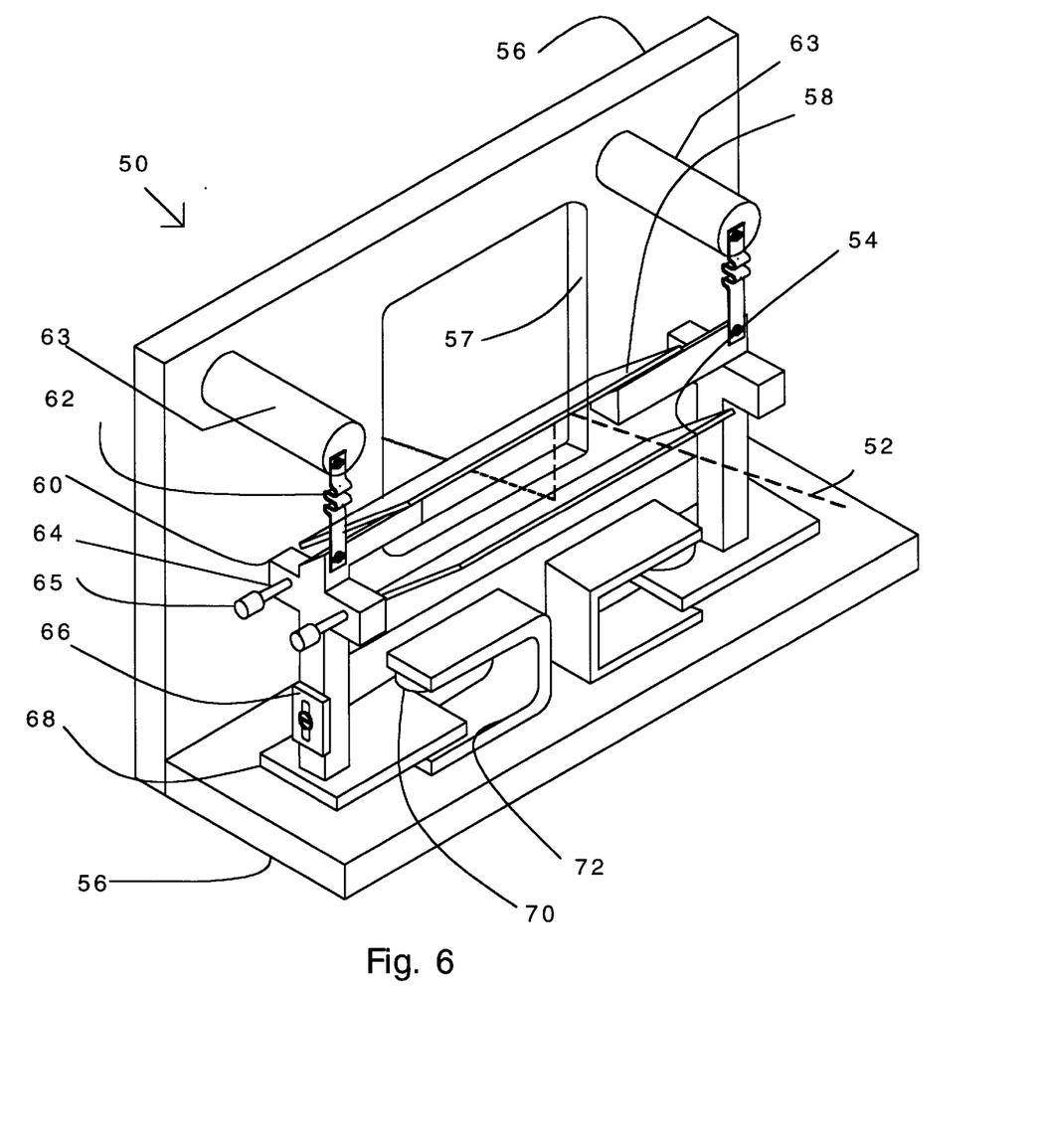
FIG. 6 is a perspective view showing one embodiment of a device for leveling the distance measuring beam, both outgoing and incoming, with some components removed for clarity.

A particular embodiment of a self-leveling module 50 for a distance measuring instrument is more completely shown in FIG. 6. The optical path for the outgoing and incoming beams is shown by the single dashed line 52. A mirror 54 is fixedly mounted on a module frame 56 which is fixed to a base or housing, as the base 22 in FIG. 3. The mounting for the mirror 54 is not shown. A hole 57 in the frame is large enough for both outgoing and incoming laser beams. A mirror 58 is the compensating mirror which deflects the beams. This mirror reflects the light beams from its underside, as with the mirror 32 in FIG. 4. A pendulum side frame 60 supports the mirror 58 and is hung from a flexible member 62 which in this preferred embodiment is a folded leaf spring, supported by brackets 63 fixed to or integral with the frame 56. Mechanical bumpers 64 with rubber caps 65 protrude from the pendulum side frame to interact with structure shown in FIG. 8 and described below. The side frame also supports an adjustable weight 66 that may be raised and lowered to adjust the pendulum's stiffness for adjustment of the compensation. Heavy or light weights may be added as needed to adjust the compensation. A copper damping plate 68 is fastened to the bottom of the pendulum side frame 60 to provide eddy current damping to pendulum motion with the aid of a magnet 70 and a magnet pole piece 72.

Figure 7:
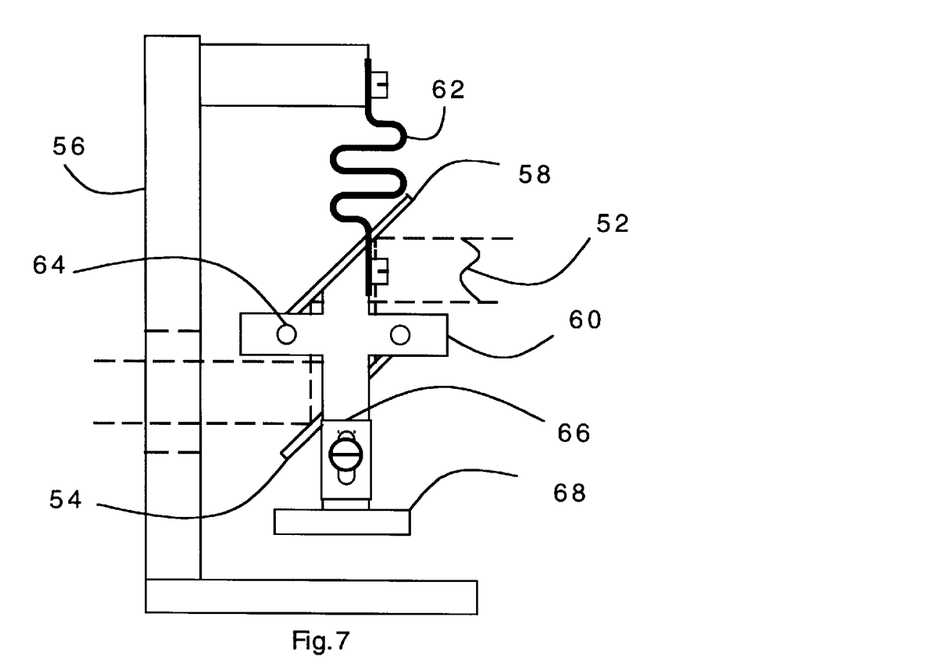
FIG. 7 is a side elevation view showing the system of FIG. 6, with some components removed for clarity.
Figure 8:
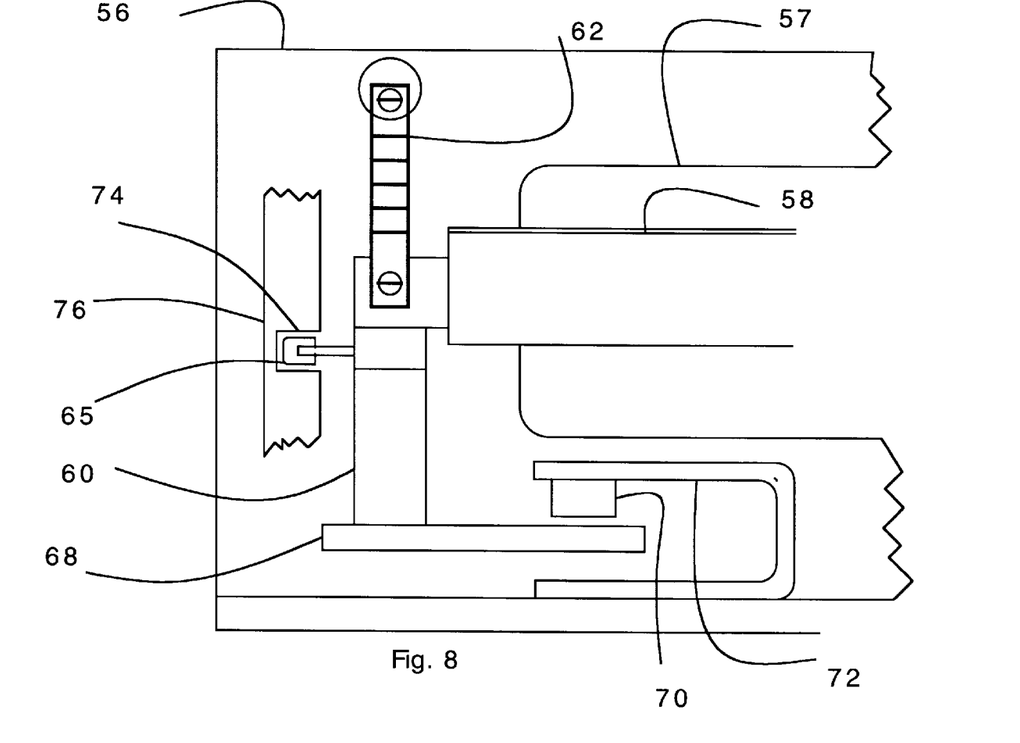
FIG. 8 is a frontal elevation view showing the system of FIGS. 6 and 7, again with some components removed for clarity.

Details of the embodiment are further clarified by the side and front views of one half of the compensator shown in FIGS. 7 and 8. For clarity the mirror mount for the mirror 54 (which is rigidly mounted on the frame 56) and the magnet 70 with its pole piece 72 are not shown in FIG. 7. FIG. 8 shows clearly the operation of the magnetic damping. Motion of the copper damping plate or vane 68 through the magnetic field induces damping forces in the pendulum.

A channel 74 is provided in a fixed member 76, which is partially shown in FIG. 8 but omitted from FIGS. 7 and 6 for clarity. The channel (preferably one on each side of the pendulum device) limits the motion of the pendulum and provides shock mounting. The rubber cap 65 strikes end walls (not shown) and top and bottom walls of the channel 74 in the member 76 for limiting motion. In summary, the pendulum assembly consisting of the reflecting mirror 58 swings freely when the module is tilted. The deflection is controlled by the stiffness of the spring 62 and the weight of the pendulum. The motion is damped magnetically and shock mounted mechanically.

Figure 9:
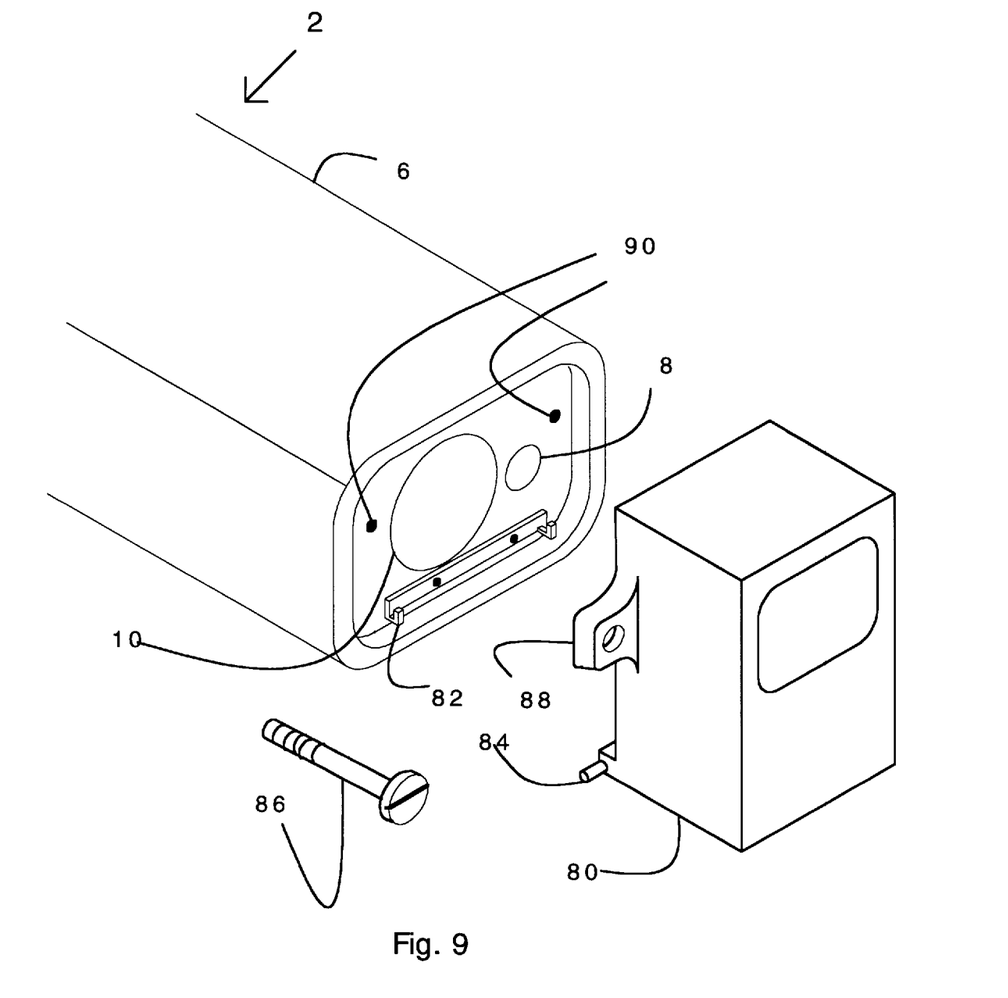
FIG. 9 is a schematic perspective view showing the self-leveling device as a separate component and indicating a mechanical registry arrangement for securing the separate component to a distance measuring laser projector instrument.

The self-leveling module may be designed as an accessory to a distance measuring instrument as shown in FIG. 9. In this case the operator may choose to use the accessory for horizontal work and disconnect it when measuring at steep angles or in the vertical plane. A self-leveling module 80, preferably having internal components as in FIGS. 6–8, is fastened to the housing 6 of the distance measuring instrument 2 by means which provide accurate mechanical registration and rapid deployment. In the illustrated embodiment a bracket 82 mates to pins 84 on each side of the module of FIG. 9. A screw 86 secures the module through an eye 88 into a threaded hole 90 in the housing. Although not visible, a similar mounting eye and screw are on the far side of the module. Provision can be made for a single, more central screw; there are many other ways of achieving such a fastening which will be obvious to those skilled in the art.

Figure 10:
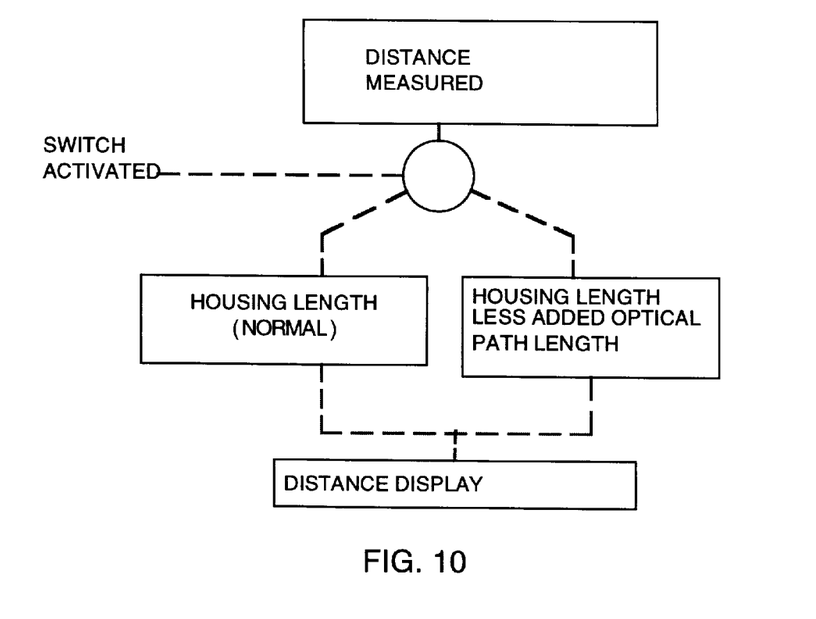
FIG. 10 is a block diagram indicating function of a switch on the distance measuring instrument, for correcting for added optical path length.

The optical path length through the modified instrument is now slightly longer and must be corrected by the operator or by a switch in the housing 6 as indicated in FIG. 10, which automatically subtracts the correct amount of distance from the display to correct for the added path length. As shown in FIG. 10, the distance measuring laser projector instrument normally will add the housing length to the distance read electronically via the projected beam and return beam. That is, it will normally add the distance between the location of a target or "zero" mark on the housing which is to be placed at the point of measurement (normally, the back end of the housing) and the position of the laser diode and return beam receiver 10 (FIGS. 1 and 2) in the housing, to the distance calculated. In the case where the accessory module 80 of FIG. 9 is used, the path length is lengthened by reflection between the two mirrors, and this additional optical path length is subtracted from the housing length normally added. This can be under control of a manual switch, indicated in FIG. 10 but not shown on the instrument in FIG. 9, or it can be automatic, by electrical conduction from the securing of the accessory module 80 to the front end of the distance measuring instrument as shown in FIG. 9.

A small error is introduced even to this path-length corrected distance measurement when the instrument is tilted, this error increasing with deeply tilted orientations. See FIG. 5. However, normally the operator will use the instrument in an orientation which is within a few degrees of horizontal, and this small error will be negligible.

Figure 11:
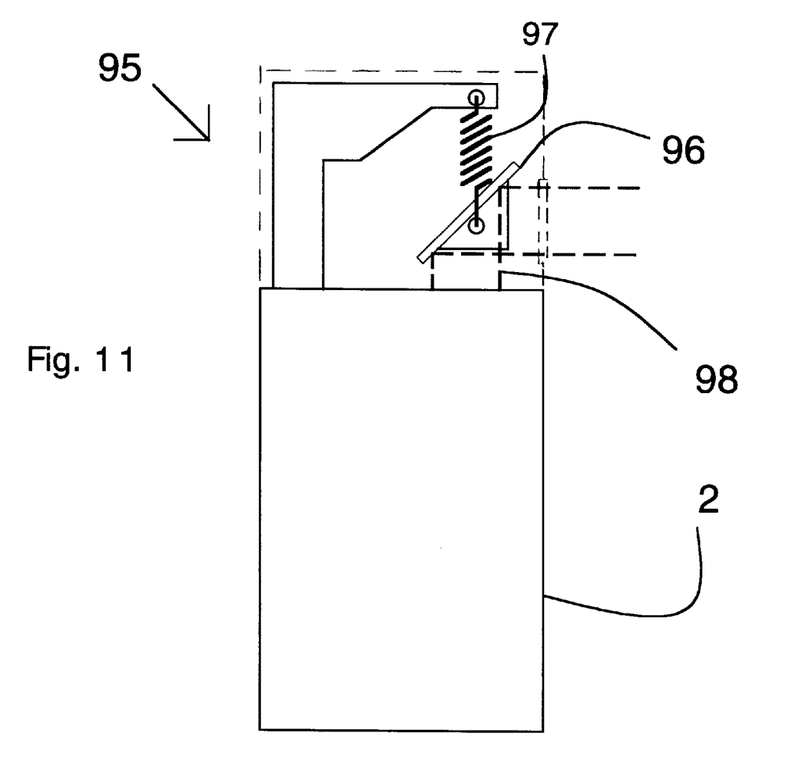
FIG. 11 is a schematic elevation view showing one method of use of a distance measuring instrument with a particular form of leveling accessory according to the invention.

FIG. 11 shows schematically use of an accessory module 95 which has only a single tilt compensating mirror 96, which again forms part of a pendulum including a flexible pendulous member 97 which may be a spring that bends at one-half the rate of tilt of the accessory. In the method of use of such an accessory, the distance measuring instrument 2 is simply turned on end when the accessory is to be used, to project the laser beam 98 vertically as shown. Correction is made for the added optical path length, including the added length due to the beam in the vertical orientation, in a manner similar to that described above.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. In combination with a distance measuring laser beam projecting instrument which produces a calculated distance measurement based on the speed of light and time of laser beam travel, a system for compensating for tilt of the instrument so as automatically to project a level distance measuring laser beam and for receiving a return signal and directing the return signal into the instrument for calculation of distance, comprising:

a frame fixed relative to the instrument, a first mirror secured in a fixed position relative to the frame, the first mirror being in the path of the laser beam from the distance measuring instrument and obliquely angled to the laser beam, a pendulum supported by the frame and having a second mirror on the pendulum, the pendulum including a flexible pendulous support member of stiffness selected such that the pendulous support member allows the pendulum to bend during tilt of the frame by half the amount of the tilt of the frame, and the second mirror being positioned in the path of the laser beam reflected from the first mirror and so oriented that when the distance measuring instrument is truly horizontal, the second mirror is parallel to the first mirror, wherein tilt of the housing is compensated so as to project a substantially precise horizontal beam, and the return signal is reflected back into the instrument by the second and first mirrors.

2. The apparatus of claim 1, further including means for damping swinging motion of the pendulum.

3. The apparatus of claim 1, further including shock mounting means for confining motion of the pendulum during sudden accelerating movements of the instrument and frame and for cushioning the pendulum during such motion.

4. The apparatus of claim 1, wherein the frame or housing comprises a separate component with means for securing the separate component to and removing it from the distance measuring laser instrument.

5. The apparatus of claim 4, wherein the securing means comprises at least one registry pin and a corresponding socket secured to the separate component and to the distance measuring instrument and adapted to closely register positions of the separate component and the instrument, and at least one fastener to tightly secure the component to the instrument.

6. The apparatus of claim 1, wherein the first mirror is positioned substantially at 45 degrees to the laser beam from the instrument.

7. In combination, a distance measuring laser beam projecting instrument which produces a calculated distance measurement based an the speed of light and time of laser beam travel and a compensation system for compensating for tilt of the instrument so as to project a level distance measuring laser beam and for receiving a return signal and directing the return signal into the instrument for calculation of distance, comprising:

a frame fixed relative to said instrument, a pendulum supported by the frame and having a beam compensating mirror on the pendulum, the pendulum including a flexible pendulous support member of stiffness selected such that the pendulous support member allows the pendulum to bend during tilt of the frame by half the amount of the tilt of the frame, and the beam compensating mirror being positioned in the path of the laser beam from the instrument and so oriented as to reflect the laser beam to substantially truly horizontal.

8. The apparatus of claim 7, further including means for damping swinging motion of the pendulum.

9. The apparatus of claim 7, further including shock mounting means for confining motion of the pendulum during sudden accelerating movements of the instrument and frame and for cushioning the pendulum during such motion.

10. The apparatus of claim 7, wherein the frame or housing comprises a separate accessory with means for securing the separate accessory to and removing it from the distance measuring laser instrument.

11. The apparatus of claim 7, wherein said beam compensating mirror comprises the sole mirror in the compensation system, and the combination including the laser beam projecting instrument's being oriented so as to project its laser beam generally vertically, so that the generally vertical beam is reflected by said beam compensating mirror.

12. The apparatus of claim 7, wherein the compensation system further includes a fixed mirror secured in a fixed position relative to the frame, and in the path of the laser beam from the distance measuring instrument and obliquely angled to the laser beam, and the fixed mirror and the beam compensating mirror being so oriented that when the distance measuring laser beam instrument is truly horizontally oriented, the two mirrors are parallel.

13. The apparatus of claim 7, further including means in the distance measuring instrument for correcting the calculated distance for added optical beam path length due to the compensation system.

14. A method for compensating for a tilt condition of a distance measuring laser beam projecting instrument, so as automatically to project a level distance measuring laser beam, and so as to receive a return signal and direct the return signal into the instrument for calculation of distance, comprising:

securing rigidly to the distance measuring laser beam projecting instrument a tilt compensating accessory module having a housing, intercepting the distance measuring laser beam with a mirror, the mirror being mounted on a pendulum within the housing of the accessory module, and the pendulum including a flexible pendulous support member of stiffness selected such that the support member allows the pendulum to bend during tilt of the instrument and the housing by half the amount of the tilt of the instrument and housing, the mirror being so oriented as to correct the distance measuring laser beam to substantially truly horizontal.

15. The method of claim 14, including the step of placing the distance measuring laser beam projecting instrument in a position to project its beam generally vertically, and the mirror in the housing of the accessory module being oriented so as to be at 45° to vertical when the beam from the instrument is projected truly vertically.

16. The method of claim 14, wherein the accessory module further includes a fixed mirror secured in the housing of the module and positioned at an oblique angle to the laser beam from the instrument and the two mirrors being so oriented that when the distance measuring instrument is truly horizontal the two mirrors are parallel, and the method including placing the instrument with the attached accessory module approximately horizontal to make a distance measurement.

17. The method of claim 16, further including automatically making a distance correction within the distance measuring instrument for increased beam path length due to use of the accessory module.

18. The method of claim 14, further including automatically making a distance correction within the distance measuring instrument for increased beam path length due to use of the accessory module.

19. The method of claim 16, further including the step of using the substantially truly horizontal beam from the accessory module as a level reference in operations separate from the measurement of distance.

20. The method of claim 14, further including the step of using the substantially truly horizontal beam from the accessory module as a level reference in operations separate from the measurement of distance.

\* \* \* \* \*